Oct. 31, 1950     N. ERLAND AF KLEEN     2,528,004
REFRIGERATION
Filed Dec. 26, 1944     3 Sheets-Sheet 1

INVENTOR.
NILS ERLAND AF KLEEN
BY
Arthur P. Cyr
ATTY

Oct. 31, 1950     N. ERLAND AF KLEEN     2,528,004
REFRIGERATION
Filed Dec. 26, 1944     3 Sheets-Sheet 2
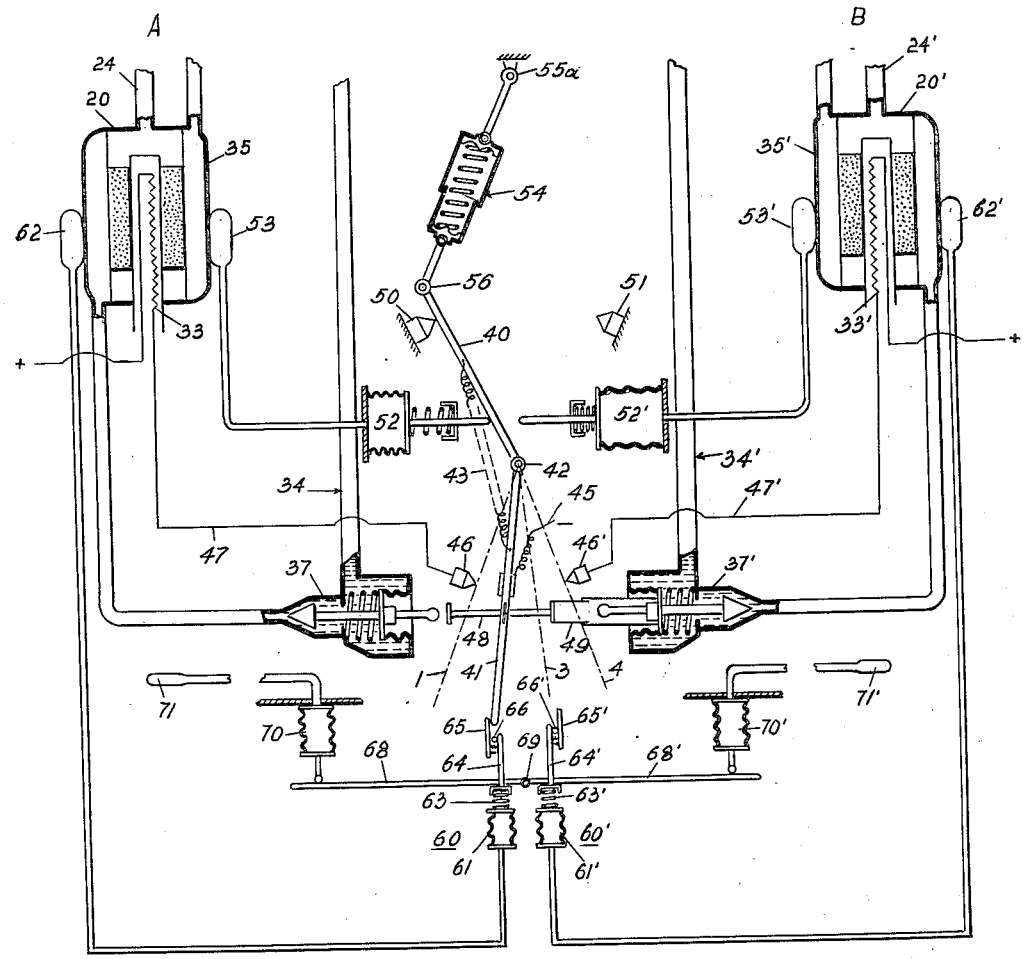
INVENTOR.
NILS ERLAND AF KLEEN
BY Arthur P. Cyr
ATTY.

Oct. 31, 1950  N. ERLAND AF KLEEN  2,528,004
REFRIGERATION
Filed Dec. 26, 1944  3 Sheets-Sheet 3
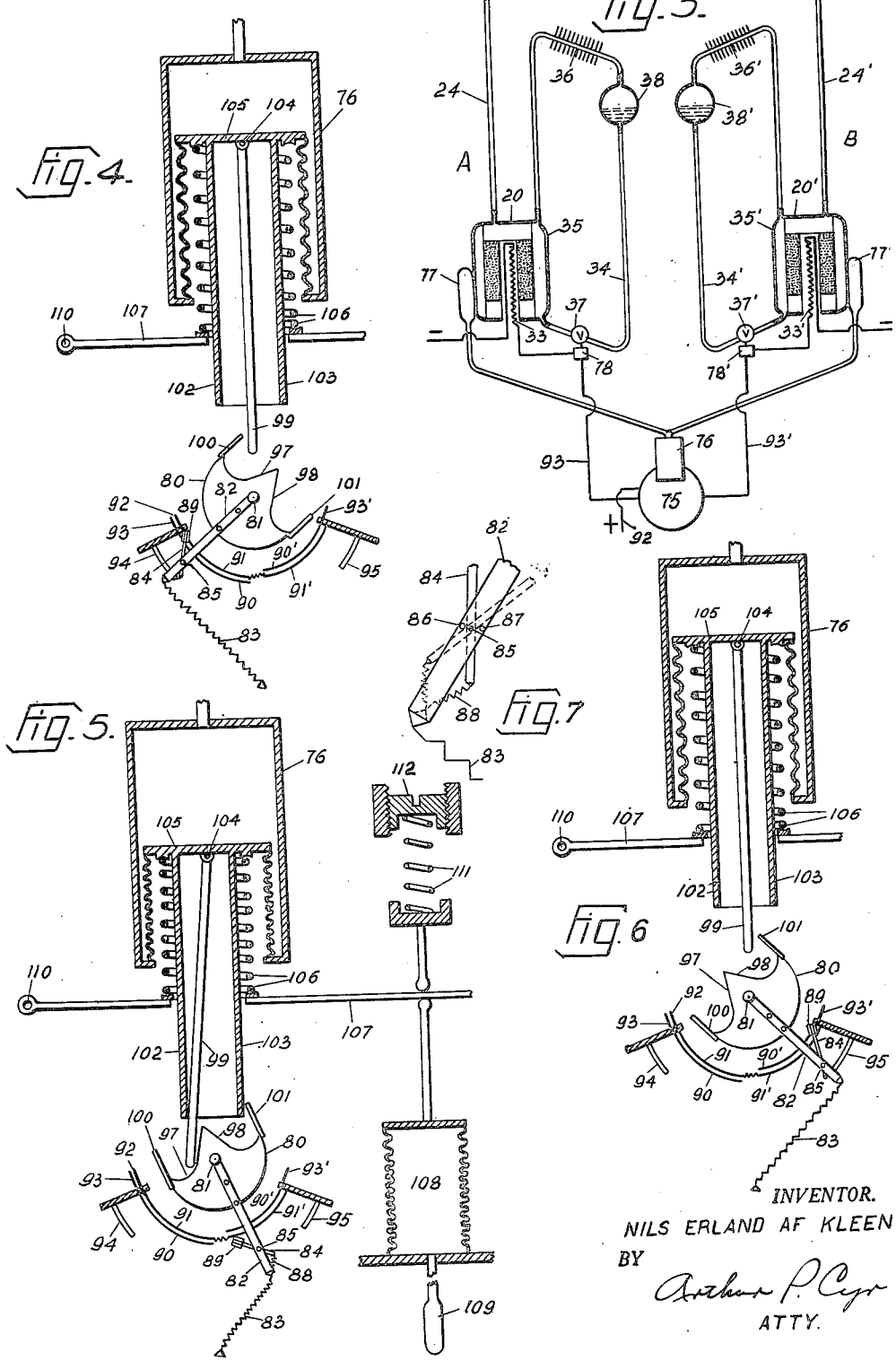
INVENTOR.
NILS ERLAND AF KLEEN
BY
Arthur P. Cyr
ATTY.

Patented Oct. 31, 1950

2,528,004

UNITED STATES PATENT OFFICE 2,528,004

REFRIGERATION

Nils Erland af Kleen, Stockholm, Sweden, assignor to Kleen Refrigerator, Inc., Hoboken, N. J., a corporation of Delaware Application December 26, 1944, Serial No. 569,874

1 Claim. (Cl. 62—5)

This invention relates to new and useful improvements in the art of refrigeration and more particularly continuous refrigeration with the aid of two or more intermittent absorption or adsorption refrigerating units and is a continuation-in-part of my now abandoned application Serial #439,369, filed April 17, 1942.

For convenience, the invention will be described in connection with intermittent absorption refrigerating apparatus, but as the same is equally applicable to adsorption type refrigeration, it is to be understood that the use of the terms "absorb," "absorber," "absorbent," "absorbing," "absorption," etc. in the following description and appended claim is intended to include the corresponding terms applicable to intermittent adsorption refrigerating apparatus.

One of the objects of the invention is to operate two or more intermittent absorption refrigerating units in time-delayed relationship with respect to the generating periods of one another and in overlapping relationship with respect to the absorbing periods of one another so as to provide continuous refrigeration with intermittent periods during which refrigeration is produced by all of said units and alternate periods during which refrigeration is produced by at least one of said units.

Another object of the invention is to produce continuous refrigeration with the aid of two or more intermittent absorption refrigerating units by operating said units on alternate generating and absorbing periods but in overlapping relationship with respect to the absorbing periods of one another and in time-delayed relationship with respect to the generating periods of one another.

A further object of the invention is to control the operation of two or more intermittent absorption refrigerating units in time-delayed relationship with respect to the generating periods of one another and in overlapping relationship with respect to the absorbing periods of one another in accordance with the conditions in each of said units with compensation for changes in ambient temperature so as to maintain the aforesaid operating relationship of the units over a wide range of operating conditions.

The above and other objects of the invention together with the advantages derived therefrom will become more apparent from the following description when taken in conjunction with the accompanying drawings in which similar reference characters have been used to indicate like parts throughout the several views, and in which Fig. 1 is a diagrammatic view of a refrigerator embodying two intermittent absorption refrigerating units and one form of control for operating the units in accordance with the invention;

Fig. 2 is a diagrammatic view illustrating a modification of the invention;

Fig. 3 is a similar view illustrating another modification of the invention;

Figs. 4, 5 and 6 are details of the control diagrammatically illustrated in Fig. 3 and showing the parts in different positions, respectively; and Fig. 7 is an enlarged fragmentary detail of the circuit-controlling switch forming part of the control of Figs. 3 to 6.

Figure 1:
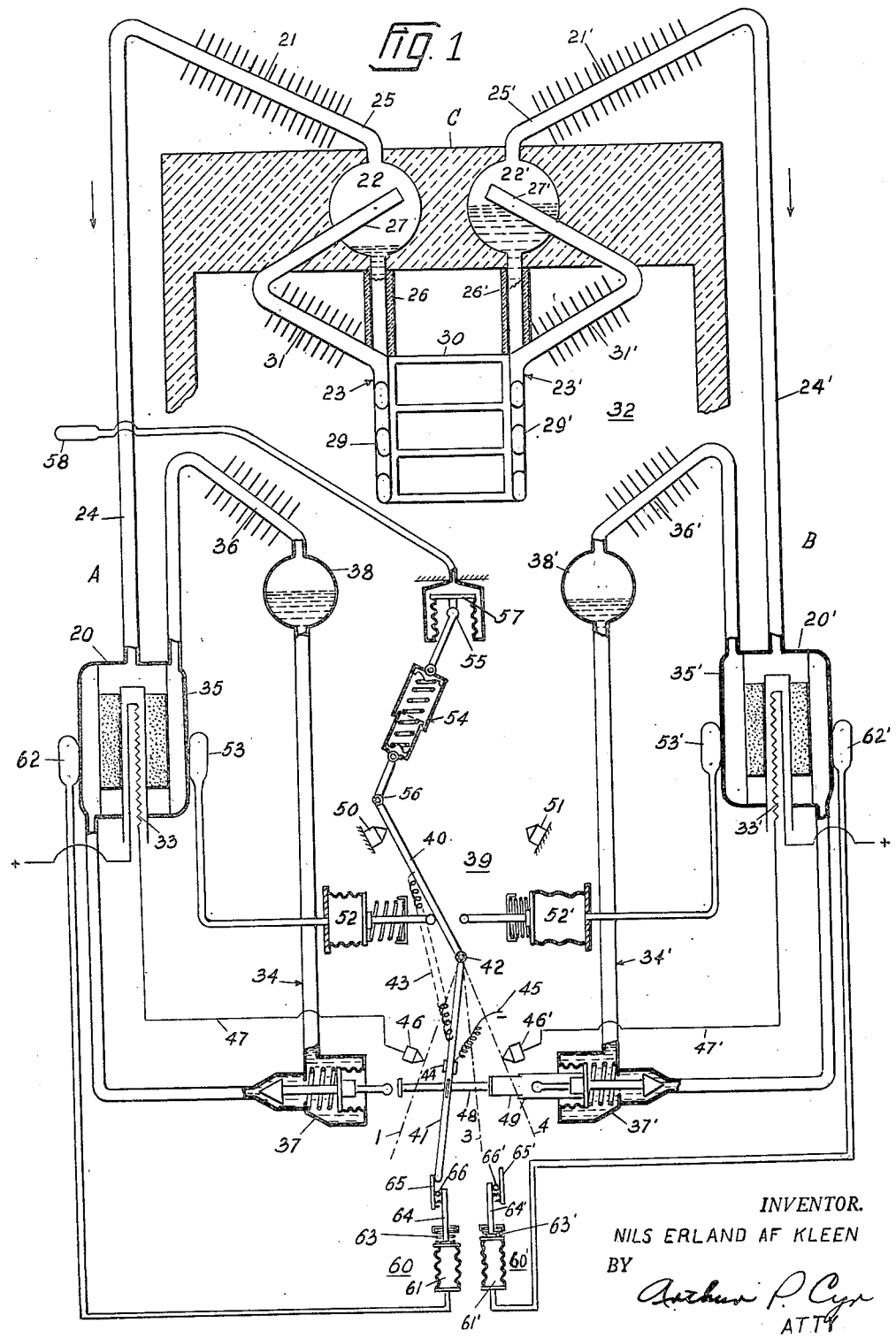

Referring first to Fig. 1 of the drawings, the refrigerator diagrammatically illustrated comprises a pair of intermittent absorption refrigerating units A and B associated with a household refrigerator cabinet C. Inasmuch as the units are similar to one another, only the various parts of unit A will be described in detail, it being understood that unit B has similar parts which, for convenience, have been designated by the same reference numerals used for the corresponding parts of unit A but distinguished therefrom by the addition of a prime (').

Each unit is constructed and designed to operate with comparatively short generating periods and comparatively long absorbing periods and comprises a boiler-absorber or generator-absorber 20 containing strontium chloride or other suitable absorbent capable of absorbing ammonia or other refrigerant fluid employed, a condenser 21 provided with heat dissipating fins arranged to be cooled by air, a receiving vessel 22 embedded in the thermal insulation of cabinet C, and an evaporator 23 located within the thermally insulated space of the cabinet.

The absorbent chamber of the boiler-absorber 20 is connected by a conduit 24 to the condenser 21 and the latter in turn is connected by a conduit 25 to the vessel 22. The evaporator 23 is connected to the lower portion of the vessel 22 by a thermally insulated inlet conduit 26 for refrigerant liquid and is also connected to the upper portion of said vessel at a suitable point above the normal level of liquid in the latter by a return conduit 27 for refrigerant vapor. The evaporator 23 has a heat transferring or cooling part 29 welded or otherwise thermally bonded to the heat conducting shell of an ice-freezing chamber or the like 30 to provide a comparatively low temperature in the latter and has another heat transferring or cooling part 31 thermally unconnected with respect to the freezing chamber 30 and preferably provided with heat transferring fins for cooling the air in the main storage space 32 and provide a higher temperature in the latter than in the freezing chamber 30.

Each unit is provided with a heater or other suitable heating means 33 to supply the necessary heat to the boiler-absorber during the generating period to liberate the refrigerant from the absorbent.

Each unit is also provided with a vaporization-condensation cooling circuit 34 or other suitable cooling means to cool the boiler-absorber and dissipate the necessary heat during the absorbing period of the unit to effect evaporation of refrigerant liquid in the evaporator and absorption of the vapor by the absorbent and thus produce a refrigerating effect in the freezing chamber 30 and storage space 32. The cooling circuit 34 has a vaporization portion 35 in the form of a jacket in heat exchange relation with the absorbent chamber of the boiler-absorber 20 and has a condensation portion or secondary condenser 36 provided with heat dissipating fins arranged to be cooled by air.

The cooling circuit is charged with methyl chloride or other suitable heat transferring fluid and is provided with a valve 37 for controlling the flow of liquid from the secondary condenser 36 to the jacket 35 and is also provided with a collecting vessel 38 for storing the liquid when the valve is closed.

In order to compensate for changes in the demands for refrigeration, that is, refrigerator loads, the heating rate of the heating means 33 and the corresponding cooling rate of the cooling means 34 may be controlled by any suitable means as well known in the art.

In operation, heat is supplied to the boiler-absorber 20 by the heater 33 and the refrigerant vapors liberated from the absorbent under influence of the heat supplied pass to the condenser 21 by way of conduit 24. The refrigerant vapors are condensed in the condenser 21 under cooling action of the cooling air and the refrigerant liquid delivered by pipe 25 to the vessel 22 and evaporator 23. When all of the refrigerant that can be utilized for refrigeration purposes has been liberated from the absorbent chamber of the boiler-absorber 20, heating is interrupted and cooling initiated by circulation of the heat transferring fluid in the circuit 34 in heat exchange relation with the boiler-absorber 20. During this cooling period, evaporation of refrigerant liquid takes place in the evaporator 23 to cool the chamber 30 and the air in storage space 32 of the cabinet C and the vapor is absorbed by the absorbent in the boiler-absorber 20.

Thus, each unit has a heating or generating period during which refrigerant vapors are liberated from the absorbent in the boiler-absorber 20, condensed in the condenser 21 and the liquid collected in the receiving vessel 22 and evaporator 23 followed by a cooling or absorbing period during which the refrigerant liquid evaporates in the evaporator part 29 in heat exchange relation with the freezing chamber 30 and in the evaporator part 31 in heat exchange relation with the air in the main storage space 32 and the refrigerant vapor is reabsorbed by the absorbent in the boiler-absorber.

In this manner, as each evaporator has a heat transferring part thermally unconnected with respect to the low temperature chamber 30 and to the corresponding heat transferring part of the other unit, the said heat transferring part of each evaporator will alternately be coated with frost and be defrosted automatically during the absorbing period and generating period, respectively, of the respective unit and thus provide a relatively high humidity in the storage space 32.

It will thus be seen that by alternating the generating periods of each of said units and also alternating the absorbing periods of each of said units that substantially continuous refrigeration will be produced. However, inasmuch as the refrigerant delivered to the evaporator of each unit during the generating period of the latter is comparatively warm, it is desirable and advantageous to operate the units in time-delayed relationship with respect to the generating periods of one another and in overlapping relationship with respect to the absorbing periods of one another so as to provide a period immediately following the generating period of one unit and immediately preceding the generating period of the other unit when both units are absorbing. In this manner, at the time the refrigerant is delivered to the evaporator during the generating period of each unit, the evaporator of the absorbing unit will have already attained a low value. Consequently, the influence of the comparatively warm refrigerant on the high and low temperature chambers 30 and 32 of the cabinet and on the associated evaporator parts 31 and 29 of the absorbing unit will be materially less than would be the case if such refrigerant were delivered at a time when the evaporator temperature is being lowered.

Accordingly, the operation of each unit from generating to absorbing and vice versa is automatically controlled by a change-over device 39 common to both units and operating said units in time-delayed relationship with respect to the generating periods of one another and in overlapping relationship with respect to the absorbing periods of one another. The change-over device 39 includes a pair of movable levers 40 and 41 pivotally mounted as at 42 in end-to-end relationship and operatively connected together intermediate their ends by a toggle spring 43 to provide a snap action type control for cooperation with the heating means and cooling means of each unit. The lever 41 is normally maintained by the spring 43 in one or the other of two circuit-closing and valve-closing positions indicated by dot-and-dash lines 1 and 4, respectively, and carries a circuit-controlling contact 44 connected by a line 45 to a source of current for cooperative engagement with one or the other of a pair of stationary contacts 46 and 46', respectively, arranged on opposite sides thereof, the former connected by line 47 to the heater 33 and the other connected by line 47' to the heater 33'. The lever 41 also carries a cross-arm 48 or other suitable means guided as at 49 for cooperative engagement with one or the other of the valves 37 and 37', respectively, also arranged on opposite sides thereof and normally maintained in open position.

The lever 40 is arranged between a pair of limiting stops or abutments 50 and 51 and is movable from one abutment to the other and vice versa to effect movement of the lever 41 from one of its circuit-closing and valve-closing positions to the other and vice versa by the expansible bellows or other movable members 52 and 52', respectively, or a pair of opposite disposed thermostats, the former responsive to the temperature of the boiler-absorber 20 by means of thermostat bulb 53 and the other responsive to the temperature of the boiler-absorber 20' by means of thermostat bulb 53'.

Each of the thermostat bellows 52 and 52' operates against a counterbalancing force or pressure provided by any suitable means such, for example, as a snap spring device 54 anchored at one end as at 55 in alignment with the pivot 42 and operatively connected at its other end as at 56 to the lever 40. In this manner, the lever 40 will be moved from each abutment to a position just past dead center to effect movement of the lever 41 from a respective circuit-closing and valve-closing position and thereby interrupt operation of the heating means and simultaneously initiate operation of the cooling means of the associated unit at a critical boiler-absorber temperature attained during the generating period of said unit.

Inasmuch as condensation of the refrigerant vapors liberated during the generating periods of each unit is dependent upon and varies with the ambient temperature, it is desirable and advantageous to vary the aforesaid critical boiler-absorber temperature with changes in ambient temperature so as to compensate for changes in the condensation temperature of the refrigerant. Accordingly, the anchor point 55 of the snap spring device 54 is carried by the expansible bellows or other movable member 57 of a thermostat responsive to the ambient air temperature by means of a thermostat bulb 58 so as to vary the counterbalancing pressure provided against each of the thermostat bellows 52 and 52' in accordance with changes in ambient air temperature.

In order to prevent the lever 41 from being fully switched over from a respective circuit-closing and valve-closing position to the other and vice versa until the associated unit has completed its absorbing period, I have provided a pair of thermostat assemblies 60 and 60', the former including an expansible bellows 61 responsive to the temperature of the boiler-absorber 20 by means of thermostat bulb 62 and the thermostat assembly 60' including an expansible bellows 61' responsive to the temperature of the boiler-absorber 20' by means of a thermostat bulb 62'. Each expansible bellows 61 and 61' operates against a counter-balancing force or pressure provided by a spring 63 and 63' and carries an arm 64 and 64' arranged at a suitable point intermediate the circuit-closing and valve-closing positions of the lever 41. Each arm 64 and 64' in turn carries a projecting finger 65 and 65' for movement into and out of the path of movement of the lever 41 respectively to prevent and permit movement of the latter to a respective circuit-closing and valve-closing position. Each projecting finger 65 and 65' is hingedly mounted as at 66 and 66' on its associated arm to permit movement of the lever 41 in one direction from a respective circuit-closing and valve-closing position but to prevent movement of said lever in the opposite direction to said circuit-closing and valve-closing position. In this manner, each thermostat assembly 60 and 60' will prevent the lever 41 from being switched over to a respective circuit-closing and valve-closing position to initiate operation of the heating means and discontinue operation of the cooling means of the associated unit until the boiler-absorber of the said unit has been cooled to a critical temperature, which critical temperature should be high enough to enable the same to be attained by the cooling means at the highest ambient air temperature at which the unit is designed to operate.

The operation of the installation just described is as follows:

With the parts of the change-over device 39 occupying the positions shown in full lines in Fig. 1, the valve 37 and 37' are open and the heaters 33 and 33' deenergized so that both units A and B are absorbing, the former being in its last stage of its absorbing period and unit B being in its early stage of the absorbing period. As the boiler-absorber 20 of unit A continues to be cooled by the cooling action of the heat transferring fluid circulating through the cooling circuit 34, the thermostat bellows 61 will gradually contract until the critical temperature is attained in the boiler-absorber 20 when the finger 65 of the thermostat assembly 60 will be moved out of the path of movement of the lever 41 and permit the latter to be shifted by the toggle spring 43 into the position indicated by dot-and-dash line 1. In this position of the lever 41, the heater 33 will be energized and the valve 37 will be closed to initiate the generating period and simultaneously terminate the absorbing period of unit A while unit B continues its absorbing period.

During the generating period of unit A, the temperature of the boiler-absorber 20 will rise and the thermostat bellows 52 will gradually shift lever 40 from the abutment 50 against the loading pressure of the snap spring device 54. When the temperature of the boiler-absorber has reached the critical point determined by the ambient air so that the lever 40 will have been shifted by the thermostat bellows 52 to a point just past dead center, the snap spring 54 will then take over to move the lever 40 to the abutment 51. At this time, the toggle spring 43 will shift the lever 41 from the position indicated by dot-and-dash line 1 toward the position indicated by dot-and-dash line 4. In this manner, the heater 33 will be deenergized and the valve 37 simultaneously opened to initiate the absorbing period of unit A. During the aforesaid switch-over operation of the lever 41, although the bellows 61 of the thermostat assembly 60 will be fully expanded and the finger 65 will be in the path of movement of the lever 41, the hinge arrangement provided by the pivot 66 for said finger will permit the lever 41 to be moved past the same. However, inasmuch as the boiler-absorber 20' of unit B during the generating period of unit A has not been cooled to the critical temperature desired so as to complete the absorbing period thereof, the finger 65' of the thermostat assembly 60 will interrupt movement of the lever 41 and hold the same in the position indicated by the dot-and-dash line 3 in which position the heaters 33 and 33' will be deenergized and the valves 37 and 37' will be opened to permit both units A and B to absorb. As the boiler-absorber 20' continues to be cooled, the thermostat bellows 61' will gradually contract until the desired critical temperature is attained when the finger 65' will be moved out of the path of the lever 41 and permit the latter to be moved by the toggle spring 43 to the position indicated by the dot-and-dash line 4. In this position of the lever 41, the heater 33' will be energized and the valve 37' will be closed so that unit B will now generate while unit A continues to absorb.

During the generating period of unit B, the temperature of the boiler-absorber 20' will rise and the thermostat bellows 52' will gradually move the lever 40 from the abutment 51 toward the abutment 50 against the loading pressure provided by the snap spring 54. When the temperature of the boiler-absorber 20' has risen to a critical point such that the thermostat bellows 52' will have moved the lever 40 to a position just past dead center, the snap spring device 54 will take over to shift the lever 40 into engagement with the abutment 50 and the toggle spring 43 will shift the lever 41 from the position indicated by the dot-and-dash line 4 toward the position indicated by dot-and-dash line 1. During this switch-over operation of the lever 41, although the bellows 61' of the thermostat assembly 60' will be fully expanded and the finger 65' will be in the path of movement of the lever 41, the hinge arrangement provided by the pivot 66' for said finger will permit the lever 41 to be moved past the same. However, inasmuch as the boiler-absorber 20 of unit A, during the generating period of unit B, has not been cooled to the desired critical end temperature, the finger 65 of the thermostat assembly 60 will interrupt movement of the lever 41 and hold the latter in the position shown in full lines in Fig. 1 to repeat the cycle of operations just described.

In this manner, the change-over device 39 operates at a high boiler-absorber temperature determined by the ambient temperature and attained during the generating period of each unit to terminate the generating period and simultaneously initiate the absorbing period of said unit and operates at a low boiler-absorber temperature attained during the absorbing period of each unit to terminate the absorbing period and simultaneously initiate the generating period of said unit.

Instead of varying the temperature to which the boiler-absorber of each unit is heated during the generating periods of the unit in accordance with changes in ambient air temperature as affecting the condensation of the refrigerant vapors liberated, it may be desirable, in order to simplify the control, to heat the boiler-absorber of each unit to a critical temperature independent of changes in ambient air temperature. In this instance, the critical temperature should be high enough so that condensation of refrigerant vapors will take place even at the highest ambient temperature in which the refrigerator is operated.

Accordingly, as shown in Fig. 2, the snap spring device 54 of the change-over mechanism 39 may be anchored as at 55a on a fixed pivot so that each of the expansible bellows 52 and 52' operates against a predetermined counter-balancing force or pressure to shift the lever 40 from a respective abutment to a position just past dead center at a predetermined boiler-absorber temperature attained during the generating period of each unit.

Moreover, instead of cooling each boiler-absorber to a predetermined temperature which is fixed for all operating conditions of the unit, it may be desirable and advantageous, especially with air employed as the cooling medium, to vary the aforesaid critical temperature in accordance with changes in ambient air so as to enable the boiler-absorber of each unit to be cooled to the lowest temperature that can be attained at the prevailing ambient temperature.

For this purpose, as also shown in Fig. 2, the counterbalancing force or pressure provided by the spring 63 against the expansible bellows 61 of the thermostat assembly 60 may be varied in accordance with changes in ambient air temperature by a thermostat arrangement including a cross-arm 68 pivotally mounted at one end as at 69 and movable on its pivot by the expansible bellows 70 of a thermostat responsive to ambient air temperature by means of thermostat bulb 71. Similarly, the counterbalancing force or pressure provided by the spring 63' against the bellows 61' of the thermostat assembly 60' may be varied in accordance with changes in ambient air temperature by a thermostat arrangement including a cross-arm 68' pivotally mounted at one end as at 69 and movable on its pivot by the expansible bellows 70' of a thermostat responsive to ambient air temperature by means of thermostat bulb 71. In this manner, the projecting fingers 65 and 65' of the thermostat assemblies 60 and 60', respectively, will be moved out of the path of movement of the lever 41 at a critical boiler-absorber temperature determined by the ambient air temperature.

In still other instances, it may be desirable and advantageous to interrupt operation of the heating means and simultaneously initiate operation of the cooling means of one unit at a critical boiler-absorber temperature attained during the generating period of said unit and to continue operation of the cooling means and correspondingly delay operation of the heating means of the other unit until the boiler-absorber of the first-named unit has been cooled to a certain temperature and then to continue operation of the cooling means of said first unit but to interrupt operation of the cooling means and simultaneously initiate operation of the heating means of the second-named unit.

Such an installation is shown in Fig. 3 in which the heating means and cooling means of each of the units A and B are controlled by a change-over device 75 actuated by a single bellows thermostat assembly 76 responsive to the temperature of the boiler-absorber 20 of unit A by means of thermostat bulb 77 and responsive also to the temperature of the boiler-absorber 20' of unit B by means of thermostat bulb 77'. For convenience in illustrating the invention, only those parts of each unit necessary to the operation of the control have been shown, the omitted parts being the same as those heretofore described and illustrated in Fig. 1. Moreover, the valves 37 and 37' of the cooling circuits 34 and 34' have been indicated, for convenience in illustrating the principle of the invention, as electrically-operated by suitable motors 78 and 78', each of said motors operating, when energized, to close its associated valve and, when deenergized, to open said valve.

As best seen from Figs. 4 to 7, the change-over device 75 includes a rocking member 80 rotatable on an axis 81 from one extreme position to another and vice versa and carries an arm 82 projecting radially outwardly therefrom and movable therewith. A snap spring 83 cooperates with the projecting end of the arm 82 to maintain the rocking member 80 normally in one or the other of its extreme positions.

The arm 82 carries a circuit-controlling switch finger 84 pivotally mounted thereon as at 85 for movement from one to another of two circuit-closing positions determined by a pair of limiting stops 86 and 87 (Fig. 7). A snap spring 88 cooperates with the finger 84 to maintain the latter normally in one or the other of its circuit-closing positions. One end of the switch finger 84 is provided with an electrical conductor 89 which, when the switch finger occupies one of its circuit-closing positions, cooperates with a pair of stationary contacts 90 and 91 and, when the switch finger occupies its other circuit-closing position, cooperates with another pair of stationary contacts 90' and 91'.

The contacts 90 and 91 of the first-named pair are arranged in an arc on one side of the axis 81 for engagement by the conductor 89 during a predetermined part of the movement of the rocking member 80 in counterclockwise direction from one of its extreme positions, whereas the contacts 90' and 91' of the second-named pair are arranged in an arc on the other side of the axis 81 for engagement by the conductor 89 during a predetermined part of the movement of the rocking member 80 in clockwise direction from the other one of its extreme positions.

Each of the contacts 91 and 91' of each pair is connected by line 92 to the positive line of the current source, whereas contact 90 of the first-named pair is connected by line 93 to the valve motor 78 and heater 33 in turn connected to the negative line of the current source, while contact 90' of the second-named pair is connected by line 93' to the valve motor 78' and heater 33' in turn connected to the negative line of the current source as clearly shown in Fig. 3.

The switch finger 84 is automatically shifted from one of its circuit-closing positions to the other and vice versa by a pair of abutments 94 and 95, the former arranged adjacent one end of the pair of contacts 90 and 91 and limiting the extent of movement of the rocking member 80 in a clockwise direction and abutment 95 being similarly arranged adjacent one end of the pair of contacts 90' and 91' and limiting the extent of movement of the rocking member 80 in counterclockwise direction. In this manner, when the rocking member reaches the limit of its movement in clockwise direction, the conductor 89 on the switch finger 84 will be brought into cooperative engagement with the pair of contacts 90 and 91 to close the circuit to the valve motor 78 and the heater 33 and energize said parts during movement of the rocking member 80 in counterclockwise direction until the latter passes dead center and the conductor 89 rides beyond the terminus of the aforesaid pair of contacts. Similarly, when the rocking member 80 reaches the limit of its movement in counterclockwise direction, the conductor 89 on the switch finger 84 will be brought into cooperative engagement with the pair of contacts 90' and 91' to close the circuit to the valve motor 78' and the heater 33' and energize said parts during movement of the rocking member in clockwise direction until the latter passes dead center and the conductor 89 rides beyond the terminus of the aforesaid pair of contacts.

As before mentioned, the change-over device 75 is actuated by the thermostat assembly 76. For this purpose, the control member 80 of the change-over device is provided with a pair of diverging contact surfaces 97 and 98 engageable in alternation by one end of a reciprocatable plunger rod 99 upon successive reciprocations of the latter so as to be moved respectively from one of its extreme positions to the other in clockwise direction and from the second extreme position to the first in clockwise direction. The control member 80 is also provided with a pair of projecting fingers 100 and 101, the former arranged adjacent one end of the contact surface 97 for engagement by one end of a reciprocatable arm 102 movable into the path of movement thereof during movement of said control member in clockwise direction at a suitable point past dead center, and the other projecting finger arranged adjacent one end of the contact surface 98 for engagement by one end of a reciprocatable arm 103 movable into the path of movement thereof during movement of said control member in counterclockwise direction at a suitable point past dead center.

The plunger rod 99 is pivotally secured at its opposite end as at 104 and the arms 102 and 103 are each rigidly secured at their opposite ends to the movable diaphragm 105 of the bellows assembly 76 for movement in one direction, that is, toward the control member 80 during the generating periods of each of the units A and B and for movement in the opposite direction, that is, away from the control member 80 during the absorbing periods of each of said units. A spring 106 interposed between an adapter 107 and the diaphragm 105 exerts a counterbalancing force or pressure against the operating pressure of the bellows assembly 76 for operation of the plunger rod 99 to move the control member 80 to a position just past dead center at a critical temperature attained during the generating period of a respective unit and operation of each of the arms 102 and 103 to interrupt movement of the control member 80 at the aforesaid critical temperature and to permit movement of said control member by the spring 83 to a respective extreme position at another critical temperature attained during the absorbing period of said unit.

In order to compensate for changes in ambient air temperature as affecting the condensation temperature of the refrigerant liberated during the generating periods of each unit, a thermostat including an expansible bellows 108 responsive to the ambient air temperature by means of thermostat bulb 109 (Fig. 5) cooperates with one end of the adapter 107 to move the latter on its pivot 110 and vary the counterbalancing pressure provided by the spring 106 in accordance with changes in ambient air temperature and thus determine the critical operating temperature of the plunger rod 99 and of the arms 102 and 103 of the thermostat assembly 76. A spring loading device 111 also cooperates with the adapter 107 to provide a setting for the thermostat assembly 76, which setting may be altered by an adjusting nut 112 to accommodate the thermostat assembly to different climatic conditions.

In operation, with the parts of the change-over device 75 and thermostat assembly 76 occupying the positions shown in Fig. 4, the heater 33 and valve motor 78 are energized while the heater 33' and valve motor 78' are deenergized so that unit A is generating and unit B is absorbing. As the temperature of the boiler-absorber 20 rises under influence of the heat supplied by the heater 33, the plunger rod 99 of the diaphragm 105 will engage contact surface 97 and gradually rock the control member 80 on its axis 81 in a counterclockwise direction against the action of the snap spring device 83. During this movement of the control member, the conductor 89 of the switch finger 84 will move across the pair of arcuate contacts 90 and 91 so that the heater 33 and valve motor 78 will continue to be energized until the boiler-absorber 20 has been heated to a critical temperature when the control member has been rocked by the plunger rod 99 to a position just past dead center of the spring device 83 so that the latter takes over to continue movement of the control member in the same counterclockwise direction beyond the terminus of the pair of contacts 90 and 91 to deenergize the heater 33 and the valve motor 78 and initiate the absorbing period of unit A.

However, as shown in Fig. 5, inasmuch as the free end of the arm 103 at this critical temperature is in the path of movement of the finger 101 carried by the control member 80, the latter will be held in an intermediate position during which the valve motors 78 and 78' and the heaters 33 and 33' will be deenergized so that both units A and B will absorb. As the temperature of the boiler-absorber 20 drops during the cooling period, the pressure in the bellows assembly 76 drops correspondingly and the arm 103 will gradually be moved in a direction away from the finger 101 until that point is reached corresponding to a certain temperature to which it is desired to cool the boiler-absorber 20 when the arm 103 has been moved out of the path of the finger 101 to permit the control member 80 to be rocked to its extreme operating position shown in Fig. 6 by the spring 83. During the aforesaid movement of the control member 80 by the spring 83, the fixed abutment 95 will cooperate with the switch finger 84 to trip the latter so that its conductor 89 now cooperates with the pair of contacts 90' and 91' to complete the circuit to the heater 33' and valve motor 78' to initiate the generating period and simultaneously terminate the absorbing period of unit B while unit A continues to absorb.

As the temperature of the boiler-absorber 20' rises under influence of the heat supplied by the heater 33', the pressure will increase correspondingly in the bellows assembly 76 so that the plunger rod 99 will now be moved into cooperative engagement with the contact surface 98 to rock the control member 80 in a clockwise direction against the action of the spring 83. During this movement of the control member, the conductor 89 of the switch finger 84 will move across the pair of arcuate contacts 90' and 91' so that the heater 33' and the valve motor 78' will continue to be energized until the boiler-absorber 20' has been heated to a critical temperature such that the control member has been rocked by the plunger rod 99 to a position just past dead center of the spring device 83 so that the latter takes over to continue movement of the control member in the same clockwise direction beyond the terminus of the pair of contacts 90' and 91' to deenergize the heater 33' and the valve motor 78' and initiate the absorbing period of unit B.

However, inasmuch as the free end of the arm 102 at this critical temperature is in the path of movement of the finger 100 carried by the control member 80, the latter will be held in an intermediate position during which the valve motors 78 and 78' and the heaters 33 and 33' will be deenergized so that both units A and B will absorb. As the temperature of the boiler-absorber 20' drops, the pressure in the bellows assembly 76 drops correspondingly and the arm 102 will gradually be moved in a direction away from the finger 100 until that point is reached corresponding to a certain temperature to which it is desired to cool the boiler-absorber 20' when the arm 102 has been moved out of the path of finger 100 to permit the control member 80 to be moved to its extreme position shown in Fig. 4 by the spring 83 to initiate the generating period and simultaneously terminate the absorbing period of unit A to repeat the cycle of operations just described.

It will thus be seen from the above description of the fundamental principle underlying the invention that I have provided a new mode of operation for two or more intermittent absorption refrigerating units resulting in the production of continuous refrigeration for a space to be cooled with intermittent periods during which refrigeration is produced by all of said units simultaneously and alternate periods during which refrigeration is produced by at least one of said units.

It will also be observed that I have also provided a new and improved control for operating each of two or more intermittent absorption refrigerating units on alternate generating and absorbing periods but in time-delayed relationship with respect to the generating periods of one another and in overlapping relationship with respect to the absorbing periods of one another so as to provide a period immediately following the generating period of one of the respective unit and immediately preceding the generating period of the other respective unit when all of the units are absorbing.

It will be further observed that by practicing the invention, the heating effect on the space being cooled of the warm refrigerant delivered thereto during the generating period of each unit will be materially reduced so as to enable a correspondingly lower temperature to be attained in the space and with less fluctuations than has heretofore been possible with two or more intermittent absorption refrigerating units operating in out-of-phase relationship.

Although I have shown and described the invention in connection with a control thermostatically operated in response to the boiler-absorber temperature of each unit, it will be obvious to those skilled in the art that the invention can be carried out by a control responsive to the temperature of any other part of each unit or to other operating condition in any suitable part of each unit. Therefore, it is to be understood that the invention is not intended to be confined to the particular control illustrated except as limited by the appended claim.

From the foregoing it is believed that the invention and the advantages derived therefrom will be readily understood by those skilled in the art without further description, it being borne in mind that numerous changes may be made in the details disclosed without departing from the spirit of the invention as set out in the following claim.

What I claim is:

Apparatus for continuous refrigeration comprising two absorption refrigerating units each of which is provided with an independent generator-absorber and with an evaporator connected in heat-transfer relationship to the evaporator of the other unit, heating means associated with each generator-absorber and adapted to be intermittently operated to provide alternate generating and absorbing periods therein, the heating means being of such heating capacity as to complete the generating period of each generator-absorber in less than half of the absorbing period therefor, a thermostatic control means associated with each generator-absorber responsive to the temperature therein in such manner as to terminate operation of the heating means for one generator-absorber during the absorption period of the other generator-absorber, and means actuated by said thermostatic control means for delaying initiation of the heating-generating period of one generator-absorber until the temperature of the other generator-absorber has fallen to a predetermined low value during its cooling-absorbing period, whereby to delay generation of refrigerant vapor and delivery of the resulting warm refrigerant vapor to the evaporator of one unit until evaporation of refrigerant in the evaporator of the other unit has reduced the temperature thereof to said low value, and whereby the two refrigerating units are operated in out-of-phase relationship with overlapping of their absorbing-refrigerating periods.

NILS ERLAND AF KLEEN.

REFERENCES CITED

The following references are of record in the file of this patent:

UNITED STATES PATENTS

| Number | Name | Date |
|---|---|---|
| 2,021,994 | Hainsworth | Nov. 26, 1935 |
| 2,039,588 | Forsberg | May 5, 1936 |
| 2,037,939 | Sarnmark | July 27, 1936 |
| 2,276,948 | Kleen | Mar. 17, 1942 |
| 2,379,278 | Coons | June 26, 1945 |